United States Patent [19]

White

[11] Patent Number: 4,476,382

[45] Date of Patent: Oct. 9, 1984

[54] ENCODING SCHEME FOR ARTICLES

[75] Inventor: Roy H. White, Germantown, Md.

[73] Assignee: Intex Inc., Bethesda, Md.

[21] Appl. No.: 471,692

[22] Filed: Apr. 21, 1983

Related U.S. Application Data

[62] Division of Ser. No. 199,376, Oct. 21, 1980.

[51] Int. Cl.$^3$ ............................................. G06K 19/06
[52] U.S. Cl. .................................... 235/491; 235/487; 235/494
[58] Field of Search .................. 235/491, 494; 378/44, 378/46

[56] References Cited

U.S. PATENT DOCUMENTS

| | | | |
|---|---|---|---|
| 2,957,079 | 10/1960 | Edholm | 250/53 |
| 3,051,836 | 8/1962 | Howard | 250/78 |
| 3,169,186 | 2/1965 | Howard | 250/71 |
| 3,444,517 | 5/1969 | Rabinow | 340/146.3 |
| 3,473,027 | 10/1969 | Freeman et al. | 250/71 |
| 3,486,006 | 12/1969 | Siegel | 235/61.11 |
| 3,500,047 | 3/1970 | Berry | 250/71 |
| 3,621,250 | 11/1971 | Wertzstein | 250/71 R |
| 3,663,813 | 5/1972 | Shaw | 250/71 R |
| 3,666,946 | 5/1972 | Trimble | 250/71 R |
| 4,047,033 | 9/1977 | Malmberg et al. | 250/341 |
| 4,146,792 | 3/1979 | Stenzel et al. | 250/365 |

OTHER PUBLICATIONS

Leonowich, J., et al., "Radioisotope Sources For X-ray Fluorescence Analysis", J. of Radioanalytical Chemistry, vol. 40, (1977), pp. 175 to 187.

Primary Examiner—Harold I. Pitts
Attorney, Agent, or Firm—Fisher, Christen & Sabol

[57] ABSTRACT

A scheme for encoding an article involves marking the article with a first material of at least one element, at least one compound of at least one element or a mixture located at a predetermined position on the article. The article is also marked with a second material of at least one element or a mixture thereof located at a predetermined position on the article. The first and second materials each have the property of emitting x-rays when subjected to a primary source of electromagnetic radiation of appropriate wavelength. The emission wavelength/wavelengths, and intensity/intensities for the first material are a predetermined, coded indication of the location of the second material. The emission wavelength/wavelengths and intensity/intensities of the second material are a predetermined identification or verification code for the article.

5 Claims, 3 Drawing Figures

ENCODING SCHEME FOR ARTICLES

This is a division of application Ser. No. 199,376, filed Oct. 21, 1980.

BACKGROUND OF THIS INVENTION

1. Field of This Invention

This invention relates to the field of encoding art objects, identification cards and the like, and decoding such codes on such articles.

2. Prior Art

U.S. Pat. No. 3,621,250 (Wertzstein) teaches a coding system involving a plurality of coded spots, with the code at each spot including the presence or absence of certain predetermined elements which indicate the sequence in which the information derived from those spots is to be considered. More specifically, each dot contains certain elements which indicate its digital value and other elements which indicate units, tens, hundreds and the like, so that the number 1,234 will be read even if the individual integers are read in the sequence 4, 2, 1, 3. Wertzstein, therefore, teaches the inclusion in a spot of a code which relates to what is read from other spots. Wertzstein speaks in terms of "sequence". In point of fact, what is involved in the disclosure of Wertzstein is simply a coding system for individual spots which, through the use of certain coding elements to indicate units, tens, hundreds, etc., expands the coding breadth. This is brought out by substantially contemporaneous U.S. Pat. No. 3,666,946 (Trimble) which appears to disclose essentially the same thing as Wertzstein but without using the "sequence" language.

U.S. Pat. No. 2,957,079 (Edholm) teaches a method of identifying successive articles by coding and decoding. Code members of a plurality of metal particles are applied in intelligence conveying configuration on the articles. The successive members are subjected to exciting rays to cause the particles to emit secondary rays characteristic of the coded metallic content of the members. The emitted rays are detected to produce an output signal indicative of the intelligence thus decoded from the metallic particle content of the member.

See Leonowich, J., et al., "Radioisotope Sources For X-ray Fluorescence Analysis", J. of Radioanalytical Chemistry, Vol. 40, (1977), pp. 175 to 187.

See also U.S. Pat. Nos. 3,169,186; 3,051,836; 3,444,517; 3,486,006; 3,500,047; 3,663,813; 3,473,027 and 4,146,792.

BROAD DESCRIPTION OF THIS INVENTION

An object of this invention is to provide an improved encoding scheme for articles. A further object of this invention is to provide an improved encoding scheme utilizing a primary photon source to irradiate an encoded article which then re-emits lower energy X-rays from predetermined locations. The emission from one of the elements at the primary location provides the planar or polar coordinates of the location of the second coded area, which in turn provides the validating message. Another object is to provide an encoding scheme for articles which cannot easily be decoded by unauthorized persons. Another object is to provide an encoding scheme which is highly effective in detecting counterfeited articles. Another object is to provide an encoding system for articles where, if one portion of the code is located and read, the remaining portion or portions of the code are not easily located and read. Other objects and advantages of this invention are set out herein or are obvious herefrom to one ordinarily skilled in the art.

The objects and advantages of this invention are achieved by the processes of this invention.

Broadly, this invention is an encoding scheme involving the use of a first coded dot (material) in a known, standard or readily ascertainable location on the tested object; which dot, when properly decoded, will indicate the location on the object being tested of the coded surface (dot or material) which actually carries the relevant coded information. Several of the keys of this invention include the selection of locations on various objects which cannot be located beforehand without the following information:

A. access to film records of the location of the positioning grids;
B. geometry of X-ray and detector arrangement;
C. the selection of radioisotope sources of appropriate X-ray energy;
D. the knowledge of the fact that more than one unknown substance is affixed at each grid location and that these substances fluoresce within preselected band widths, some of which may be relevant to the coded message; and
E. realization that part of the code being read may by design impart false information that would prevent deciphering and/or reveal attempted counterfeiting.

Fluorescence X-rays can be produced using a primary beam which can be X-rays, gamma rays or electrons, or other charged particles. In this invention the primary radiation is X-rays or gamma rays. The energy of the emission X-rays is characteristic of the materials in the target.

When a beam of X-rays (photons) is passed through a material, the material becomes a source of emitted X-rays and electrons. The intensity of the emitted radiation is weak compared with the primary radiation. There are two types of emitted X-rays, namely, scattered X-rays and fluorescence X-rays. The fluorescence X-rays (unlike scattered X-rays) are characteristic of the target material and do not change with change in wavelength of the primary beam as long as the primary-beam wavelength is short enough to excite the fluorescence.

With X-ray fluorescene the absorbed radiation is spontaneously emitted (about $10^{-12}$ to $10^{-13}$ seconds after excitation). Electrons in the target atoms are removed from the atoms forming an ion by either Compton or photo-electric processes or both. Transitions of the electron from outer shells back to the ground level can occur spontaneously with the emitted radiation, that is, characteristic of the difference in Bohr (electron binding) energy of the two states. Thus, the fluorescence X-rays originate when electrons are ejected from some of the atoms in the target, leaving them in an ionized state, i.e., deficient in electrons. As the atoms regain their normal energy state, energy may be liberated in the form of fluorescence X-rays. The two main types of fluorescence X-rays that can be excited in most of the elements are known as the K and L characteristic X-rays. Characteristic X-rays are emitted by all elements. The energy of these X-rays increases in a regular manner in going from one element to the next in atomic number.

Generally, the process of light production is known as fluorescence. However, the terminology implies the more general phenomenon of energy emission either in the visible or non-visible portions of the electromagnetic spectrum. In one embodiment of this invention, a target material such as barium sulphate would be irradiated with radioactive $^{55}$Fe. The primary emission from this source has a 5.89 KeV value (the manganese $K_\alpha 1$ transition energy). When the compound barium sulphate is irradiated by X-ray energy of that magnitude, it is possible to detect the presence of barium and sulfur which exhibit K or L shell transition energy spectra at levels below the primary X-ray energy source.

In this invention X-ray radiation is detected through the use of special crystal detectors such as cesium iodide (doped with europium), iodide, (doped with thallium) and mercury iodide.

This invention relates specifically to the detection of X-rays which are re-emitted by the target of the primary energy source. The origin of emitted X-rays can be any of the uncombined elements or compounds of those elements which are present in the target. Each element in the combined or uncombined state emits x-radiation of wavelengths characteristic of that element. The amount of emitted x-radiation at each wavelength can be measured with a detector of the type referred to heretofore, and the amount of energy measured is proportional to the concentration of individual elements in the target.

More specifically, this invention involves a method of decoding the code located on an article. The method includes irradiating the article with a primary beam composed of high energy photons to locate a first material contained at a predetermined position on the article; or a known predetermined position on the article which has a first material located thereon is irradiated. The first material contains at least one element, at least one compound of at least one element or a mixture thereof. The first material has a predetermined size or area of deposition on the article. The first material has the property of emitting fluorescence X-rays when subjected to a beam of high energy photons. Detection of the emitted fluorescence X-rays is done by means of a detector which detects and measures the wavelength or wavelengths and intensity or intensities thereof for the first material. The wavelengths and intensities are a predetermined, coded indication of the location of a positioned article at a second predetermined position. The predetermined position on the article where the second material is located is irradiated with a primary beam composed of high energy photons. The second material contains at least one element, at least one compound of at least one element or a mixture thereof. The second material has a predetermined size of area of deposition on the article. The second material has the property of emitting fluorescence X-rays when subjected to high energy photons. As has been described for the first material, detection of the emitted fluorescence X-rays is done by means of a detector which detects and measures the wavelength or wavelengths and intensity or intensities thereof for the second material. The detected wavelengths in the invisible portion of the electromagnetic spectrum are a predetermined identification or verification code.

Preferably, the primary X-ray energy is produced by a radioisotope source.

The encoding elements or compounds of the elements used in the development of this invention include one or more of the rare earth elements and/or one or more of the elements or compounds having atomic numbers between 16 and 92. The first and second materials of the detectable encoding elements each have a predetermined size of area of deposition on the article. The first and second materials each have the property of emitting fluorescence X-rays when subjected to an X-ray primary beam. The wavelengths and intensity or intensities thereof for the first material are a predetermined, coded indication of the location of the second material. The wavelength or wavelengths and intensity or intensities thereof for the second material are a predetermined identification or verification code for the article.

The articles which can be encoded by the process of this invention include paintings, tapestries, statues, silver and gold objects, other objects d'art, identification cards, other flat commercial objects, paper money, documents (e.g., historical documents, account cards, checks, passports, deeds, data tapes, contracts, bank notes, bank cash, cards, etc.), credit cards, stamps and the like. The scheme of this invention can also be used to mark locations on data tapes so as to mark the start of pertinent data, a message, etc.

This invention also includes a method of placing the code on an article by such means as to render the coding material in situ permanent and indistinguishable.

The locations of the targets and the components and their absolute and relative concentrations in the targets for each marked article can be kept in an archive for later usage and verfication.

The compounds and elements used are preferably of analytical reagent grade and have no interferring amounts of impurities.

DETAILED DESCRIPTION OF THIS INVENTION

Charged particles or photons can be used as the primary radiation to produce fluorescence X-rays, but photons are preferred.

This invention generally uses X-rays as the primary beam. This invention utilizes X-ray radiation from one, two or more radioisotopes as the primary energy source.

X-rays can be produced by accelerating electrons through a high voltage in a vacuum and then stopping them abruptly in a target of some dense material. X-rays are also produced in radioactive decay. The photons are preferably produced from a radioisotope source instead of an X-ray tube. The X-ray source used in this invention is preferably a radioisotope rather than an X-ray tube. The radioisotope source exhibits better signal to noise characteristics and by its size and nature contributes significantly to the portability of the detection system. Moreover, the limited choice of X-ray tube targets puts an upper energy limit upon the X-ray that can be created.

Examples of useful radioisotope sources are $^{109}$Cd, $^{57}$Co, $^{181}$W, $^{54}$Mn, $^{241}$Am, $^{55}$Fe, $^{133m}$Sn, $^{93m}$Nb, $^{145}$Sm, $^{179}$Ta, $^{71}$Ge, $^{123m}$Te, $^{125m}$Te, $^{119m}$Sn, $^{133}$Ba, $^{139}$Ce, $^{155}$Eu, $^{195}$Au, $^{129}$I, $^{97}$Tc$^{97}$, $^{125}$I, $^{153}$Gd, $^{210}$Pb, $^{170}$Tm, $^{238}$Pu and tritium. Combinations of radioisotopes can be used (e.g., $^{155}$Eu, $^{133}$Ba and $^{57}$Co). The radioisotopes used should have as much radionuclidic purity as possible. Although the radation spectrum of any isotope is unique, the response of a detector system measuring the radiation output depends on several important variables. Maximum sensitivity is ensured by employing an exciting radiation energy which is slightly higher than the K or L absorption edge energies of the elements to be analyzed, but which also is of sufficient energy that the inelastically scattered radiation does not produce significantly overlapping background. The radioisotopes are encapsulated with materials such as aluminum, beryllium and stainless steel. In certain cases annular sources are very advantageous over point sources.

Cooled Si(Li) and Ge(Li) detectors are preferably used for detection of energy dispersive X-ray fluorescence, but a NaI(T1) scintillator or a gas proportional counter can be used. Counting times can run as high as 15 to 100 minutes, but preferably the counting time are less than one minute and as low as 3 to 10 seconds.

In any system involving identification cards, a color coding may be used in conjunction with the X-ray fluorescence evaluation. Such inspection can be accomplished either visually or by means of a simple spectrophotometer. Here the short time count X-ray fluorescence analysis, or the spectrophotometric evaluation of a color code, or a combination of both can be used when the authenticity of papers needs to be quickly and reliably established by an automatic checking device, for example, in automatic money changers or vending machines, during money transactions at bank counters, when checking identity cards, etc.

Many metallic or non-metallic elements or their compounds may be used in the passive coding substances which are applied to the articles which are encoded. Typical of those elements are the metals cobalt, copper, strontium, zinc, iron, mercury, titanium, and compounds of those metallic elements. Coupounds of many other elements can also be used, including those of arsenic, beryllium, barium, cesium, chromium, magnesium, rubidium, tin, yttrium, hafnium, gallium, tungsten, silver, gold, platinum, plutonium, osmium, potassium, calcium, technetium, thallium, iridium, indium, molybdenum, nickel, polonium, cadmium, bismuth, ruthenium, antimony, germanium, titanium, tantalum, gallium, lanthanum, scandium and uranium. The rare earth metals and their compounds are encompassed within the scope of this invention. Examples of the rare earths are cerium, dysprosium, erbium, europium, gadolinium, holmium, lutetium, praseodymium, promethium, samarium, terbium, thulium and ytterbium.

Useful non-organic compounds of the metals include oxides, bromides, chlorides, iodides, fluorides, etc. Examples are potassium bromide, strontium carbonate, barium bromide, mercuric chloride, sodium arsenite, molybdenum oxide, germanium oxide, etc. Also useful are chelated organic compounds containing one or more metallic or non-metallic elements—examples of the metallic elements are copper, chromium, iron, etc.; and examples of the non-metallic elements are sulfur, bromine, iodine, etc. Bromine and iodine are used as bromide or iodide compounds, respectively.

The elements and compounds used as targets in this invention should be in the solid state at room temperature, but do not need to be.

The characteristic emission spectra of many substances permit an unambiguous identification of these substances and of any mixtures thereof. Substances can be included which provide emission bands which are not part of the coded message. Since many of these substances can be colorless or of a matching color, they cannot be preceived with the naked eye, so that the marked points on the article cannot be distinguished. The material to be placed on target points can be suspended in a readily vaporizable liquid carrier, such as methanol, or applied by other chemical or physical means suitable to the material of the object being encoded.

X-rays as produced in an ordinary X-ray tube are of various wavelengths and intensities and differ in these characteristics based on the degree of the tube vacuum, the target material and the generating potential between target and cathode. Such rays, generated by high energy electron impingement on target materal in a vacuum, may be used for irradiation of elements, particularly the metals, to excite those elements to produce emitted or secondary X-rays which with a few exceptions are identical with, but lower in intensity than, the x-radiation produced when the same element is used as the target in an X-ray tube. Each element thus excited has a characteristic radiation by which the element can be identified by known means of detection.

The output of the detector can be counted and fed to a computer or to can be put on a screen to display intensity versus wavelength.

The encoding system of this invention which utilizes a known spot to give information as to where the actual intelligence-conveying spot is located is one broad embodiment of this invention. The position-indicating spot is reliably translated into position-fixing coordinates. The intelligence conveyed by the known spot involves not only frequency but may involve intensity, and thus is dependent on the exciting isotope, and in some instances on the intensity of the radiation therefrom.

The following are examples of useful element coding combinations, either of elemental substances or their compounds, and the relative concentration which may be used:

Coding combinations:
1. Potassium bromide, ferric chloride and strontium carbonate
2. Zinc, arsenic and zirconium oxides
3. Barium chloride, zinc chloride and rubidium nitrate In concentration approximating: (as numbered above)
1. 3 mg each/5 $mm^2$ area
2. 3:5:3 mg ratio/5 $mm^2$ area
3. 5:3:3 mg ratio/5 $mm^2$ area Placement of systems: by solution injection or saturation of fiber, surface film or substrate; or implantation by air gun of suspension, gel, or encapsulated microsphere; or by other pressure means.

The drawings illustrate another embodiment of this invention where a grid system is used.

Figure 1:
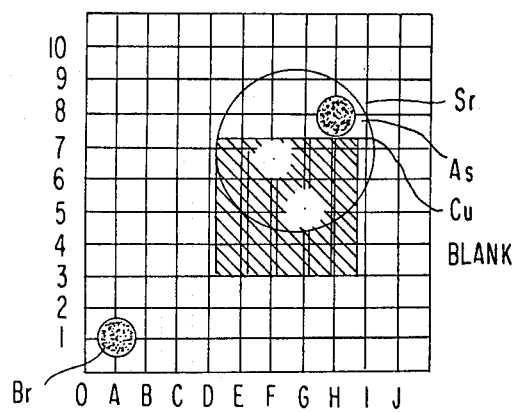
FIG. 1 is an elevational view of the grid-mask embodiment of this invention.

The grid system is particularly useful for identification (ID) cards, but can be utilized for paintings, any and all artifacts of virtually any composition, textiles, record albums, records, tape cassettes and the like. The grid system referred to above is in actuality a planar arrangement of minute particulate material of varying chemical composition, arranged, in most instances, in rectilinear coordinate fashion. A photograph is taken of the encoded area of the object with a rectilinear coordinate grid placed over that portion of the object which has been encoded. This film record provides a dimensional reference for subsequent X-ray scanning.

EXAMPLE 1

Referring to the drawings, the basic concept of the grid-mask ID system is a grid consisting of a finite level of elemental substances and/or their compounds on a substrate(s), such that a specific number of intersecting points involving two or more elements will result.

Figure 2:
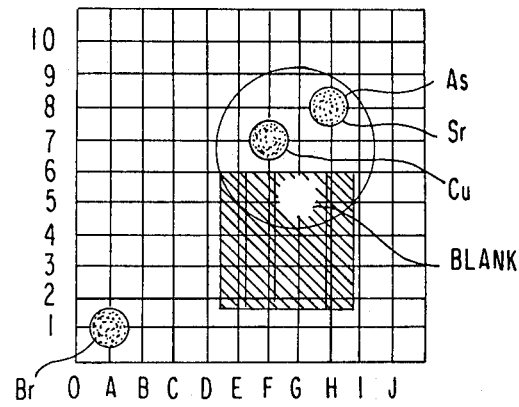
FIG. 2 is another elevational view of the grid-mask embodiment of FIG. 1.
Figure 3:
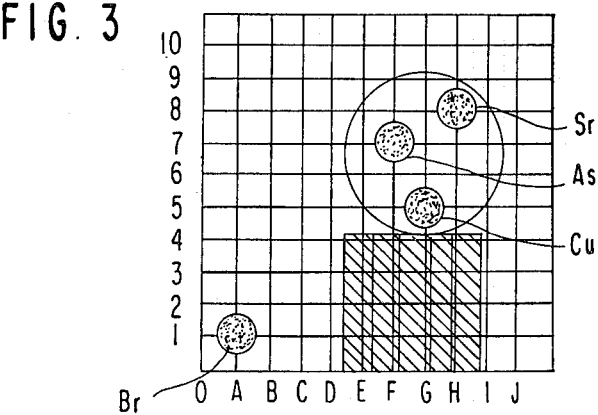
FIG. 3 is a further elevational view of the grid-mask embodiment of FIG. 1.

In FIGS. 1 to 3, a 2″ by 2″ format is shown, upon which, for example, approximately 10 elemental substances, or their compounds, can be arranged in a vertical or horizontal rectilinear coordinate scheme in such a manner that a 3 to 9 (mm) diameter circle could be scanned by the readily available PGT Model 100 Unit. Four dots are actually used in FIGS. 1 to 3. The colors for the four noted elements are:

red—strontium
yellow—arsenic
blue—copper
green—bromine

The green dot at position 1A can be a bi-element composition, rather than just bromine (as a bromide)—for example, nickel and zinc, which would give the x-y coordinates. Detection of the coded information is by X-ray fluorescence. The colored dots can be insignificant and devoid of pertinent information.

A platen or mask, with an appropriate number of holes spaced to scan one or more intersection points of the grid, would provide access to selected coordinates. For example, the mask can be made of cadmium, The limiting factor "in terms of the number of grid intersections scanned" is the geometry of the window in the radioisotope scanner. FIGS. 1 to 3 show a mask that blocks out zero or more verification dots. The dot or coordinates 1-0 is a grid position dot. If a photograph, etc., is involved, the positioning dot can be replaced with cross hair coordinates, for example. The geometry implied above might describe an alpha numeric grid comprising a 1 to 10 vertical arrangement of elemental substances (of combinations thereof or their compounds). The degree of specificity is accomplished by utilizing an initial reference intersection point, which defines the precise location of the "access" signature.

For example, assume the bi-element composition (as elements of compounds thereof) of point A-10 were zinc and nickel; the $Ka_1$ lines for those elements are 9 and 7, respectively, to the nearest whole number. This give an x-y coordinate (9, 7) and identifies the upper right corner of the grid indicated on the attached schematic for code (1). Similarly, codes II and III are characterized by X=9 and X=6 and X=9, Y=4.5 (or 5), respectively. These initial (specifying points) referred to above would be coded with the elements zinc and cobalt (positioning for code II) and zinc/titanium for positioning code III.

The cardholder could possess an elementally coded ID card varying according to levels of access. The determination of access or not would be determined by the monitor (human element) or the monitoring system.

A corollary scheme would provide the cardholder only with a platen which would limit his access based on a constantly daily changing chemical code determined by a variation in the position of the reader. If internal control over the ID cards is maintained, then replication of the card design is virtually impossible.

The elements used should exhibit X-ray energy emissions associated with either K or L shell photon release events. For the purposes of this invention these primary emission lines should have at least a 2KeV differential, and the elements selected should ideally be placed within the 3 to 17 KeV energy scale. Room temperature or cryogenic system discrimination can be used for an ID scanning system, and the system can be optimized to satisfy response time requirements.

There are numerous methods for applying the coding elements described in the preceding paragraph. One method is to apply a solution, suspension, or chelated gel, (each containing one or more elements) either simultaneously or in sequence under or on the back of the encapsulating plastic of an ID card, or any other substrate which it is desired to encode.

One or more diversionary "codes" can also be affixed to the encoded object, ID card or other object; these can be in the form of color dots printed upon the substrate, bits or magnetic material, etc., none of which contribute to the substance of the applied code.

EXAMPLE 2

The basic concept of the grid system, which in essence consists of the application or superimposition of minute quantities of encoding substances as prescribed in Example 1, can be applied to any and all manner of art, artifacts, precious and semi-precious minerals, and, in fact, any surface or substance, artificial or otherwise, for the purpose of encoding and subsequent identification by decoding through the technique of X-ray fluorescence analysis.

Once the chemical code has been affixed to the article requiring encoding, a conventional X-ray fluorescence analyzing system can be used to identify the materials in the coded stratum. A typical system which would be used for such analysis is manufactured by Tracor Northern of Middleton, Wisc.; Model #2000, used in conjunction with a cryogenic silicone crystal X-ray detection system manufactured by Princeton Gama Tech, Princeton, N.J.; Model #LS-15. A typical radioisotope which would be used in the evaluation of elemental substances or their compounds would be $^{109}$cadmium. An example of a pigmented surface is that of a postage stamp wherein a pigmented ink has been applied to an engraved plate and then transferred to the surface of a suitable paper. The arrangement of such an analytical system is with the axis of the radioisotope source (A) intersecting the axis of the detection element (B) at an angle of 60 degrees. The postage stamp C is positioned directly in front of the detector tube, at an angle of approximately 45 degrees with the axis of the radioisotope container. The XRFA analysis procedure prescribed in the above discussion would yield an elemental signature for the postage stamp being evaluated for pigment composition. A corollary application involving a similar procedure would involve the application of a microdot of a gel or paste containing a multiplicity of elemental substances or their compounds to the fabric, paper, metal or synthetic surface of an objet d'art. The encoded item could subsequently be identified by application of the XRFA technique prescribed above.

As has been heretofore indicated, virtually any manner of solid substance, artificial, natural, animal, vegetable or mineral, can be encoded in the same manner.

What is claimed is:

1. An article which contains a first material of at least one element, at least one compound or a mixture thereof located at a predetermined position on said article, and a second material of at least one element, at least one compound or a mixture thereof located at a predetermined position on said article, said first material and second material each having a predetermined size of area of deposition on said article, and said first material and said second material each having the property of emitting fluorescence X-rays when subjected to an X-ray primary beam, the wavelength or wavelengths and intensity or intensities thereof of said first material being a predetermined coded indication of the location of said second material, and the wavelength or wavelengths and intensity or intensities thereof of said second material being a predetermined identification or verification code.

2. The article as claimed in claim 1 wherein said article is in a suitably stable physical and chemical state, such as a completed work of art, to be encoded as herein described.

3. The article as claimed in claim 1 wherein said article can be exposed to X-rays of an energy sufficient to induce the necessary fluorescence without unacceptable or detrimental effects on the article.

4. The article as claimed in claim 1 wherein said article can be encoded in a manner herein described without unacceptable or detrimental effects on the article.

5. The article as claimed in claim 1 wherein the element or compound in the first residue is different than the element or compound in the second residue.

* * * * *